United States Patent [19]

Pham et al.

[11] Patent Number: 5,700,885

[45] Date of Patent: Dec. 23, 1997

US005700885A

[54] SINGLE SCREW METHOD AND APPARATUS

[75] Inventors: Hoang T. Pham, Lake Jackson, Tex.; Chad A. Strait, Clinton, Tenn.; Richard O. Kirk, Lake Jackson, Tex.

[73] Assignee: The Dow Chemical Company, Midland, Mich.

[21] Appl. No.: 549,077

[22] Filed: Oct. 27, 1995

Related U.S. Application Data

[63] Continuation of Ser. No. 184,510, Jan. 19, 1994, abandoned.

[51] Int. Cl.$^6$ ............................................. C08F 283/00
[52] U.S. Cl. ................... 525/534; 525/132; 525/165; 525/171; 525/185; 525/437; 525/440; 525/451; 525/454; 525/455; 525/92 A; 525/92 C; 525/92 J; 425/200
[58] Field of Search .................... 425/200; 525/534, 525/535, 132, 165, 171, 185, 437, 440, 451, 454, 455, 92 A, 92 C, 92 J

[56] References Cited

U.S. PATENT DOCUMENTS

| | | |
|---|---|---|
| 3,431,599 | 3/1969 | Fogelberg ................................. 18/12 |
| 3,599,292 | 8/1971 | Ronzoni et al. ..................... 18/30 SM |
| 3,712,776 | 1/1973 | Woodham et al. ...................... 425/202 |
| 3,897,937 | 8/1975 | Limbach . |
| 4,015,832 | 4/1977 | Kruder . |
| 4,047,705 | 9/1977 | Hanslik . |
| 4,092,015 | 5/1978 | Koch . |
| 4,129,386 | 12/1978 | Rauwendaal . |
| 4,234,259 | 11/1980 | Wiedmann et al. . |
| 4,277,182 | 7/1981 | Kruder . |
| 4,341,474 | 7/1982 | Wheeler, Jr. et al. . |
| 4,357,291 | 11/1982 | Miller et al. ......................... 264/176 R |
| 4,426,018 | 1/1984 | Ward ..................................... 366/76 |
| 4,501,498 | 2/1985 | McKelvey .............................. 366/69 |
| 4,798,472 | 1/1989 | Chan et al. ............................. 366/79 |
| 4,908,169 | 3/1990 | Galic et al. ............................. 366/79 |
| 4,964,730 | 10/1990 | Alznen et al. .......................... 366/81 |
| 4,994,223 | 2/1991 | Hestehave et al. ................... 425/204 |
| 5,156,790 | 10/1992 | Cucchisi et al. ...................... 425/208 |
| 5,261,743 | 11/1993 | Moller ................................... 366/196 |

FOREIGN PATENT DOCUMENTS

| | | |
|---|---|---|
| 1276763 | 11/1990 | Canada . |
| 762079 | 5/1967 | Italy . |

OTHER PUBLICATIONS

"Plastic Injection Molding Reader" (1991) by Yujiro Sakurauchi, pp. 262–265 (no month).

"The Structure of Extruders" by Wen-Ching Bookstore, Co., pp. 584–585, 589 (no month/yr.).

"Industrial Mechanics" Taiwan Industrial periodical (no month/yr).

Japanese Abstract JP A 59 194 824, 5 Nov. 1984.

*Primary Examiner*—Mark D. Sweet

[57] ABSTRACT

An extruder screw having a plurality of plasticating sections sufficient for plasticating polymeric materials of different bulk density.

25 Claims, 1 Drawing Sheet

SINGLE SCREW METHOD AND APPARATUS

CROSS-REFERENCE TO RELATED APPLICATION

This is a continuation of application Ser. No. 08/184,510, filed Jan. 19, 1994 now abandoned.

FIELD OF THE INVENTION

This invention relates to methods and apparatus useful for the plastication of polymeric material.

BACKGROUND OF THE INVENTION

Methods and apparatus for the plastication of two or more polymeric materials having different bulk density have been discovered.

SUMMARY OF THE INVENTION

In one aspect this invention involves an extruder screw comprising (a) a plasticating section having a compression ratio in the range of about 1.2 to about 5, and (b) a plasticating section having a different compression ratio in the range of about 1.2 to about 5.

In another aspect this invention involves, in an extruder for plasticating a mixture of two or more polymeric materials of different bulk density, a screw comprising (a) a first section in which the materials are compacted to an extent that the mixture has a bulk density between the highest and lowest of the respective bulk densities of the materials comprising the mixture, and a portion of the materials are plasticated, and (b) a second section in which any materials not plasticated in the first section are plasticated.

In a further aspect this invention involves a method of plasticating a mixture of two or more polymeric materials of different bulk density comprising the steps of (a) compacting a first polymeric material to the extent that its bulk density is approximately equal to that of a second polymeric material, and (b) further compacting the mixture of polymeric materials until all materials are plasticated.

In yet another aspect this invention involves an extruder screw for the plastication of two or more polymeric materials having different bulk density, comprising (a) a plasticating section having a compression ratio sufficient to plasticate a polymeric material having a bulk density of less than 0.6 g/cm$^3$, and a plasticating section having a compression ratio sufficient to plasticate a polymeric material having a bulk density of 0.6 g/cm$^3$ or more.

DETAILED DESCRIPTION OF THE INVENTION

Figure 1:
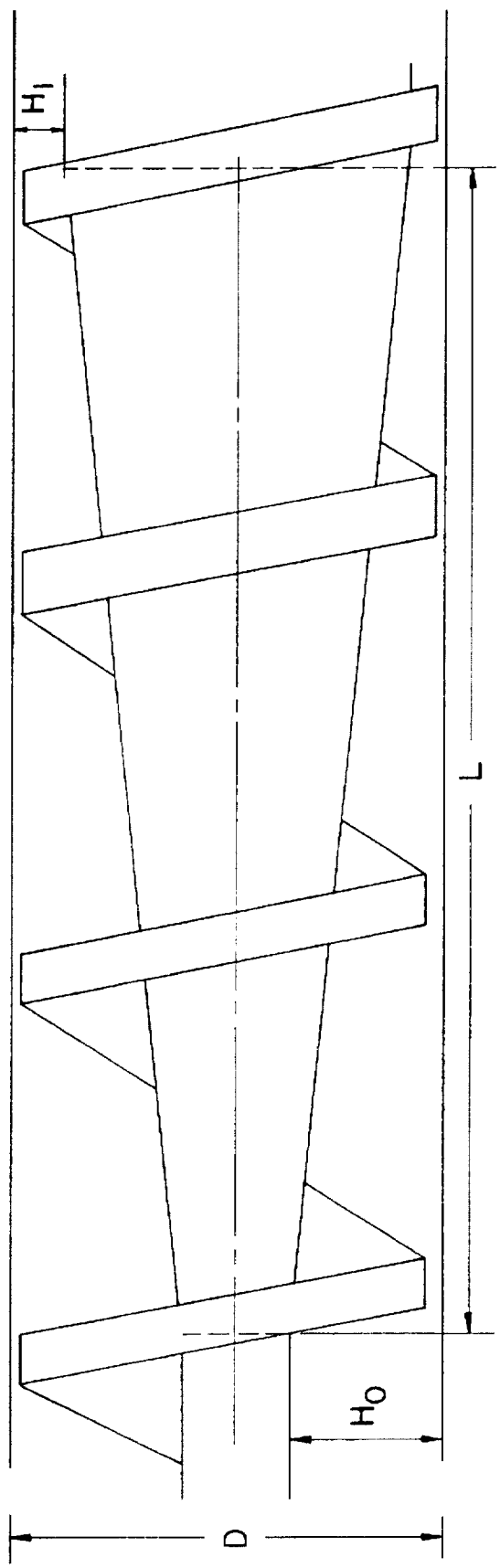
FIG. 1 shows a cross-sectional view of a plastication section of an extruder screw.

A single screw extruder is a commonly used instrument for the plastication of polymeric material. Polymeric material is useful for the fabrication of a variety of molded or shaped articles. Plastication refers to the softening of polymeric material to such an extent that it flows freely and will assume any shape. In the case of polymeric material which is crystalline, plastication is synonymous with melting. In the case of polymeric material which is amorphous, plastication occurs at about the glass transition temperature ("$T_g$").

Polymeric material may exist in a variety of different physical forms such as powder, beads, pellets, flakes, chips, fibers and strips. A polymeric material has a density, which is constant and is an inherent property of the material regardless of the shape of the physical form in which it exists. However, a polymeric material also has a bulk density, and this property is variable and is determined by the shape of the physical form in which it exists. Density may be defined as the mass of a continuous media of material per unit volume, whereas bulk density of a polymeric material may be defined as the mass of a non-continuous media of the material divided by the volume occupied by that mass.

An extruder for use in processing polymeric material is typically composed of a screw, a cylinder having one or more raised ridges (a "flight") helically disposed thereabout, which screw rotates within an annular cylinder, or barrel. The surface of the screw above which the flight(s) are raised is the root of the screw. A hopper directs polymeric material through an opening in the barrel into contact with the screw and into the space between the flight(s) and the interior wall of the barrel of the extruder.

The screw typically has an initial or feed section which begins the process of conveying the solid polymeric material forward within the barrel of the extruder, the direction of travel of the polymeric material as it is transported away from the hopper by the screw being considered the "downstream" direction. The feed section of the screw is typically followed, with or without other intervening sections, by a transition or melting section in which plastication of the polymeric material occurs. Plastication of the polymeric material occurs as a result of the combined effect of heat produced by heater bands mounted on the outside of the extruder barrel and the shearing forces to which the screw subjects the polymeric material causing friction between the internal wall of the extruder barrel and the polymeric material. The melting section of the screw is typically followed, again with or without other intervening sections, by a metering section which functions to pump the plasticated material, as extrudate, out through the downstream end of the extruder which is typically a die or some other form of restricted orifice.

Polymeric materials having different bulk densities behave differently in the melting, or plastication, section of an extruder specifically because of the different bulk densities. When polymeric material is plasticated in an extruder, the plastication mechanism involves compacting the material to obtain frictional contact of the material with the interior wall of the barrel. Materials of higher bulk density cannot be compacted as easily or readily as those of lower bulk density, and conditions which are appropriate for the compaction of one material are often not appropriate for another material or for a mixture containing that other material. The amount of difference in the bulk densities of two materials which may cause different compaction behavior is typically at least 20 percent (determined as $(P_1-P_2)100/P_2$, where $P_1$ is greater than $P_2$) may be at least 50 percent, is often at least 100 percent, and may on occasion be at least 1000 percent. A first step toward designing plastication conditions appropriate for polymeric materials having different bulk densities is to classify those materials according to the effect of bulk density on compaction behavior. It has been found that materials having a bulk density of less than 0.6 g/cm$^3$, and more particularly in the range of about 0.1 g/cm$^3$ to about 0.5 g/cm$^3$, may be more easily and readily compacted than those materials having a bulk density of 0.6 g/cm$^3$ or more, especially those in the range of about 0.7 g/cm$^3$ to about 0.8 g/cm$^3$.

Knowing the respective bulk densities of different polymeric materials to be plasticated together makes it possible to provide separate plastication conditions in the extruder, each suitable for a different material. This is done by constructing an extruder screw with two or more different plastication sections. The plastication section of an extruder screw typically has a frusto conical shape with the circumference of the cone increasing in the downstream direction. As polymeric material passes through a plastication section of an extruder, the space between the root of the screw and the interior wall of the barrel (the "channel depth") decreases, and the polymeric material is compressed. The compression ratio of a plastication section of a screw is determined by a ratio of the channel depth at the top of the frustum to the channel depth at the base of the cone (base of the frustum). This is shown in FIG. 1 as the ratio of $H_0/H_1$. The compression rate of a plastication section of a screw is determined by a relationship derived from the right triangle formed by a line intersecting the circumference of the top of the frustum and parallel to the longitudinal axis of the screw, the intersection of such line with the base of the cone (base of the frustum) and the root of the screw. This relationship is the compression ratio divided by the quantity L/D where L is the distance from the top to the base of the cone frustum and D is the diameter of the annulus of the barrel. These elements are also shown in FIG. 1.

It has been found that when two or more plastication sections are constructed in a screw for plastication of a mixture of materials having different bulk densities, a sufficient compression ratio for each such section may be in the range of about 1.2 to about 5. The compression ratio for a section in which a material having a bulk density of 0.6 g/cm$^3$ or more is to be plasticated may preferably be in the range of about 1.2 to about 3.3, and the compression ratio for a section in which a material having a bulk density of less than 0.6 g/cm$^3$ is to be plasticated may preferably be in the range of about 3.3 to about 5. A sufficient compression rate for each such plastication section may be in the range of about 0.01 to about 15, preferably about 0.05 to about 13.7. The compression rate is selected such that, for a given temperature and pressure within the extruder, a greater length is allowed for the plastication section of the screw for those materials which are relatively more difficult to plasticate because of, for example, a higher bulk density and/or a higher melting or softening temperature. The plastication sections may be constructed in the screw in any order such that one section is followed downstream by another, the downstream section having a higher or lower compression ratio and/or a higher or lower compression rate than the upstream section. One or more such plastication sections may, but need not be, immediately adjacent.

When a mixture of polymeric materials having different bulk densities is plasticated by means of a screw having two or more separate plastication sections, a first polymeric material may be compacted to the extent that its bulk density is approximately equal to that of a second polymeric material, and/or the materials may be compacted to an extent that the mixture has a bulk density between the highest and lowest of the respective bulk densities of the materials comprising the mixture. While this occurs, a portion of each material is carried downstream in the first section by the screw as a bed of unplasticated solids. However, the volume of such solids bed is progressively decreased in the first section by compression against the interior wall of the barrel as it is carried toward the base of the frusto conical shaped plastication section. Progressively decreasing the volume of the solids bed has the result of keeping it in contact with the interior wall of the barrel as a progressively larger portion of the one of the materials becomes plasticated. In a second section, all of the remaining unplasticated material is plasticated. A good indication that all material has been plasticated is that the extruder screw maintains an essentially constant output of extruded material and that the amperage of the motor which powers the extruder remains essentially constant.

Virtually any polymeric material which can be melted or heat softened may be plasticated in a mixture with another such polymeric material by the methods and apparatus of this invention. The following are exemplary of polymers and copolymers, or alloys or blends of two or more thereof, which are suitable for such plastication, but this listing is not intended to be exhaustive or to limit the scope of this invention:

polyacetal, including that which is formed by the bond opening and polymerization of the carbonyl group of an aldehyde to give a —(—CH$_2$—O—)— repeating unit, as well as the reaction products of polyols and aldehydes;

polyacrylamide;

polyacrylate;

polyacrylonitrile;

polyamide;

polyarylate poly(arylene sulfide), including that which is prepared by the reaction of p-dichlorobenzene with Na$_2$S in a polar organic solvent to give a —(—pAr—S—)— repeating unit;

azo polymers, including those which are prepared by the polymerization of an azobutyronitrile with a diamine or diol to give a —(—R—N=N—R—)— repeating unit or those prepared by polymerization of monomers containing an azo side group in addition to a polymerizable functionality to give a—[—R(N=N—R')—]— repeating unit;

polybenzimidazole, including that which is prepared by condensation of aromatic tetraamino compounds with dicarboxylic acids;

polycarbonate, including copolymers thereof;

polyester, including copolymers thereof;

poly(ethylene oxide);

polyimidazole, including that which is prepared by polymerization of vinylimidazole monomer;

polyimide, including that which is prepared by condensation of bifunctional carboxylic acid anhydrides with a diamine to give a—[—C(O)—N—R—C(O)—]— repeating unit;

poly(methyl methacrylate)

polyolefin, including copolymers thereof;

poly(phenylene ether), including that which is prepared by the oxidative coupling polymerization of a phenol to give a —(—pAr—O—)— repeating unit;

polyphosphazine, including that which is prepared by the polymerization of the cyclic trimer produced by the reaction of phosphorous pentachloride and ammonium chloride to give a —[—N=P(R$_2$)—]— repeating unit;

poly(propylene oxide);

polyquinoxaline, including that which is prepared by the solution polymerization of aromatic bis($_o$diamine) and bis(glyoxal hydrate);

polysilane;

polysiloxane;

polystyrene, including copolymers thereof;

polysulfone;

polyurea;

polyurethane; and vinyl polymers, including poly(vinyl acetate), poly(vinyl alcohol), poly(vinyl amide), poly(vinyl chloride), and poly(vinyl ether), including copolymers of each;

where, in any of the above formulae, R and R' are organic (e.g. $C_1$–$C_{20}$) radicals and Ar is an aromatic organic (e.g. $C_6$–$C_{10}$) radical.

This invention is also applicable to copolymers formed from two or more monomers or co-monomers, such copolymers including but not being limited to:

acrylonitrile/butadiene/styrene copolymer, acrylonitrile/EPDM/styrene copolymer where EPDM is ethylene/propylene/diene rubber, acrylonitrile/styrene/alkyl acrylate copolymer, poly(ester/carbonate) copolymer, ethylene/carbon monoxide copolymer, ethylene/vinyl acetate copolymer, methyl methacrylate/butadiene/styrene/acrylonitrile copolymer, phenyl maleimide/acrylonitrile/butadiene/styrene copolymer, styrene/acrylonitrile copolymer, and styrene/maleic anhydride copolymer; as well as to blends and alloys of two or more polymers and/or copolymers. Examples of such blends being:

acrylonitrile/butadiene/styrene copolymer blended with polycarbonate, polyamide, polyester, or polyurethane;

polyacetal blended with polyurethane;

polycarbonate blended with polyamide, polyester, or styrene/acrylonitrile copolymer; and polyphenylene ether blended with (i) polyamide and a vinyl aromatic/conjugated diene di- or tri-block copolymer; (ii) polyester; or (iii) polystyrene to which can be grafted a vinyl aromatic/conjugated diene di- or tri-block copolymer.

What is claimed is:

1. A method of plasticating a mixture of two or more polymeric materials of different bulk density in an extruder with a screw having one flight and two adjacent plasticating sections, comprising the steps of:

(a) compacting a first polymeric material contained in the mixture in a first plasticating section to the extent that its bulk density is approximately equal to that of a second polymeric material contained in the mixture, (b) compacting the mixture of polymeric materials in a second downstream plasticating section adjacent to the first plasticating section and which has a different compression ratio until all materials are plasticated, and (c) providing a constant output of plasticated material.

2. The method of claim 1 wherein, before plastication, the bulk density of at least one polymeric material is less than 0.6 g/cm$^3$, and the bulk density of at least one other polymeric material is 0.6 g/cm$^3$ or more, provided that the larger of the two bulk densities is at least twenty percent larger than the smaller of the two bulk densities.

3. The method of claim 2 wherein the bulk density of at least one polymeric material is in the range of about 0.1 to about 0.5 g/cm$^3$, and the bulk density of at least one other polymeric material is in the range of about 0.7 to about 0.8 g/cm$^3$.

4. The method of claim 1 wherein one or more of the polymeric materials is selected from the group consisting of polyamide; polycarbonate; polyester; poly(methyl methacrylate); polyolefin; poly(phenylene ether); polystyrene; polyurethane; olefin copolymers; styrene copolymers; and a blend of (i) poly(phenylene ether), (ii) polystyrene, and (iii) a vinyl aromatic/conjugated diene di- or tri-block copolymer.

5. The method of claim 2 wherein the larger of the two bulk densities is at least one hundred percent larger than the smaller of the two bulk densities.

6. The method of claim 1 wherein the first polymeric material is compacted by a plasticating section of an extruder screw.

7. The method of claim 1 wherein the first polymeric material is compacted by an extruder screw comprised of a plasticating section having a compression ratio in the range of about 1.2 to about 5.

8. The method of claim 7 wherein said plasticating section has a compression rate in the range of about 0.01 to about 15.

9. The method of claim 1 wherein the first polymeric material is compacted by an extruder screw comprised of a plasticating section having a compression ratio in the range of about 3.3 to about 5.

10. The method of claim 1 wherein the first polymeric material is compacted by an extruder screw comprised of a plasticating section having a compression rate in the range of about 0.01 to about 15.

11. The method of claim 1 wherein the mixture of polymeric materials is compacted by a plasticating section of an extruder screw.

12. The method of claim 1 wherein the mixture of polymeric materials is compacted by an extruder screw comprised of a plasticating section having a compression ratio in the range of about 1.2 to about 5.

13. The method of claim 12 wherein said plasticating section has a compression rate in the range of about 0.01 to about 15.

14. The method of claim 1 wherein the mixture of polymeric materials is compacted by an extruder screw comprised of a plasticating section having a compression ratio in the range of about 1.2 to about 3.3.

15. The method of claim 1 wherein the mixture of polymeric materials is compacted by an extruder screw comprised of a plasticating section having a compression rate in the range of about 0.01 to about 15.

16. The method of claim 1 wherein the first polymeric material is compacted by a plasticating section of an extruder screw having a compression ratio in the range of about 1.2 to about 5, and the mixture of polymeric materials is compacted by a plasticating section of the same extruder screw having a different compression ratio in the range of about 1.2 to about 5.

17. The method of claim 16 wherein the plasticating section in which the first polymeric material is compacted is adjacent to the plasticating section in which the mixture of polymeric materials is compacted.

18. The method of claim 16 wherein the plasticating section in which the first polymeric material is compacted is not adjacent to the plasticating section in which the mixture of polymeric materials is compacted.

19. The method of claim 1 wherein one or more of the polymeric materials is selected from the group consisting of polycarbonate; polyester; polyolefin; poly(phenylene ether); polystyrene; acrylonitrile/butadiene/styrene copolymer; olefin copolymers; and styrene/acrylonitrile copolymer.

20. The method of claim 1 wherein the polymeric materials comprise polycarbonate and acrylonitrile/butadiene/styrene copolymer.

21. The method of claim 1 wherein the polymeric materials comprise polycarbonate and polyester.

22. The method of claim 1 wherein the polymeric materials comprise polycarbonate and poly(phenylene ether).

23. The method of claim 1 wherein the first polymeric material is polycarbonate.

24. The method of claim 1 wherein the second polymeric material is polycarbonate.

25. The method of claim 23 wherein the second polymeric material is polycarbonate.

* * * * *

UNITED STATES PATENT AND TRADEMARK OFFICE
CERTIFICATE OF CORRECTION

PATENT NO. : 5,700,885
DATED : December 23, 1997
INVENTOR(S) : Hoang T. Pham et al It is certified that error appears in the above-identified patent and that said Letters Patent is hereby corrected as shown below:

Claim 1, column 5, line 44, "adjacent plasticating" should correctly read –adjacent different plasticating--.

Signed and Sealed this

Twentieth Day of June, 2000

*Attest:*

Q. TODD DICKINSON

*Attesting Officer*      *Director of Patents and Trademarks*